United States Patent
Valliappan et al.

(10) Patent No.: US 9,924,368 B2
(45) Date of Patent: Mar. 20, 2018

(54) APPARATUS AND METHODS FOR CELLULAR COMMUNICATIONS OVER UNUSED UNLICENCED SPECTRUM

(71) Applicant: QUALCOMM Incorporated, San Diego, CA (US)

(72) Inventors: Nachiappan Valliappan, San Diego, CA (US); Tamer Adel Kadous, San Diego, CA (US); Ahmed Kamel Sadek, San Diego, CA (US); Andrei Dragos Radulescu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 14/192,139

(22) Filed: Feb. 27, 2014

(65) Prior Publication Data

US 2015/0163680 A1    Jun. 11, 2015

Related U.S. Application Data

(60) Provisional application No. 61/914,677, filed on Dec. 11, 2013.

(51) Int. Cl.
*H04W 16/14* (2009.01)
*H04W 72/04* (2009.01)
(Continued)

(52) U.S. Cl.
CPC ........... *H04W 16/14* (2013.01); *H04L 5/0073* (2013.01); *H04L 27/0006* (2013.01);
(Continued)

(58) Field of Classification Search
CPC ..... H04W 16/14; H04W 36/06; H04W 48/18; H04W 52/22; H04W 68/00; H04W 72/04;
(Continued)

(56) References Cited

U.S. PATENT DOCUMENTS

| | | | |
|---|---|---|---|
| 5,802,456 A * | 9/1998 | Hulsebosch | H04W 72/06 455/451 |
| 2012/0263118 A1* | 10/2012 | Love | H04W 72/1215 370/329 |

(Continued)

FOREIGN PATENT DOCUMENTS

| | | |
|---|---|---|
| GB | 2798988 A | 8/2013 |
| WO | WO-2012/116489 A1 | 9/2012 |

(Continued)

OTHER PUBLICATIONS

W0 2012/139278 A1 Title: Methods and Apparatuses of Spectrum Sharing for Cellular-Controlled Offloading using Unlicensed Band, Applicant: SAS Mobile Corporation, Inventor: Wei Zou et al., Filing Date: Apr. 12, 2011.*

(Continued)

*Primary Examiner* — Andrew Lai
*Assistant Examiner* — Leon Andrews
(74) *Attorney, Agent, or Firm* — Liem T. Do

(57) ABSTRACT

Apparatus and methods of wireless communications are described for determining one or more bands (e.g., guard bands in wireless local area networks (WLANs)) in unused portions of an unlicensed spectrum, positioning one or more carriers for cellular communication (e.g., long term evolution (LTE) or LTE advanced communication) in the one or more bands, and performing the cellular communication over the unlicensed spectrum using the one or more carriers. In some non-limiting example aspects, the cellular communication may be in a standalone mode and the one or more carriers may include a primary component carrier (PCC) that is positioned in a Wi-Fi guard band. In these non-limiting example aspects, the apparatus and methods may further include allocating one or more secondary component carriers (SCCs) in Wi-Fi guard bands or in Wi-Fi channels, where (Continued)

the one or more SCCs are opportunistically tuned or turned ON/OFF based on cell loading or backhaul constraints.

31 Claims, 12 Drawing Sheets

(51) Int. Cl.
*H04L 27/00* (2006.01)
*H04W 52/38* (2009.01)
*H04L 5/00* (2006.01)
*H04W 52/24* (2009.01)
*H04W 52/34* (2009.01)
*H04W 52/14* (2009.01)

(52) U.S. Cl.
CPC .......... *H04W 52/34* (2013.01); *H04W 52/38* (2013.01); *H04W 72/0453* (2013.01); *H04L 5/001* (2013.01); *H04L 5/0032* (2013.01); *H04W 52/143* (2013.01); *H04W 52/243* (2013.01); *H04W 52/244* (2013.01); *H04W 52/343* (2013.01); *H04W 52/346* (2013.01)

(58) Field of Classification Search
CPC . H04W 4/53; H04W 52/243; H04W 72/1215; H04W 72/06; H04L 5/0023; H04B 1/12; H01Q 1/246
See application file for complete search history.

(56) References Cited

U.S. PATENT DOCUMENTS

| | | | |
|---|---|---|---|
| 2012/0276892 A1* | 11/2012 | Lin | H01Q 1/246 455/422.1 |
| 2012/0320865 A1 | 12/2012 | Samarasooriya et al. | |
| 2013/0195073 A1* | 8/2013 | Chen | H04L 5/0023 370/331 |
| 2013/0337821 A1 | 12/2013 | Clegg | |

FOREIGN PATENT DOCUMENTS

| | | |
|---|---|---|
| WO | WO-2012/123616 A1 | 9/2012 |
| WO | WO-2012118490 A1 | 9/2012 |
| WO | WO-2012139278 A1 | 10/2012 |
| WO | WO-2013/010323 A1 | 1/2013 |
| WO | WO-2013/071488 A1 | 5/2013 |
| WO | WO-2013071506 A1 | 5/2013 |

OTHER PUBLICATIONS

WO 2012/139278 A1 Methods and apparatuses of spectrum sharing for cellular-controlled offloading using unlicensed band Inventor: Zou et al. Applicant: Renesas Mobile Corporation, Apr. 12, 2011.*
WO 2012/139278 A1 Title: Methods and Apparatuses of Spectrum Sharing for Cellular-Controlled Offloading using Unlicensed Band Inventors: Zou, Wei et al. Applicant: Renesas Mobile Corporation Filing Date: Apr. 12, 2011.*
International Search Report and Written Opinion—PCT/US2014/069024—ISA/EPO—dated May 15, 2015 (12 pages).

* cited by examiner

APPARATUS AND METHODS FOR CELLULAR COMMUNICATIONS OVER UNUSED UNLICENCED SPECTRUM

CLAIM OF PRIORITY UNDER 35 U.S.C. § 119

The present application for Patent claims priority to U.S. Provisional Application No. 61/914,677 entitled "CELLULAR COMMUNICATIONS OVER UNUSED UNLICENSED SPECTRUM" filed Dec. 11, 2013, and assigned to the assignee hereof and hereby expressly incorporated by reference herein.

BACKGROUND

The present disclosure relates generally to communication systems, and more particularly, to cellular communications over unused unlicensed spectrum.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Recently, cellular communications such as LTE/LTE Advanced communications may be provided over unlicensed spectrum. However, such LTE/LTE Advanced communications may not share the medium efficiently with other unlicensed spectrum users such as wireless local area network (WLAN) devices. For example, Wi-Fi devices are already widespread in unlicensed spectrum, and therefore newly deployed LTE/LTE Advanced cells (e.g., small cells) need to coexist with the widespread Wi-Fi systems, and nearby Wi-Fi networks may need to be protected, especially when operating channels are generally occupied by Wi-Fi. Therefore, improvements in cellular communications over unlicensed spectrum are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the disclosure provides a method of wireless communication that includes determining one or more bands in unused portions of an unlicensed spectrum; positioning one or more carriers for cellular communication in the one or more bands; and performing the cellular communication over the unlicensed spectrum using the one or more carriers.

In another aspect, the disclosure provides an apparatus for wireless communication that includes a processing system configured to determine one or more bands in unused portions of an unlicensed spectrum; position one or more carriers for cellular communication in the one or more bands; and perform the cellular communication over the unlicensed spectrum using the one or more carriers.

In a further aspect, the disclosure provides an apparatus for wireless communication that includes means for determining one or more bands in unused portions of an unlicensed spectrum; means for positioning one or more carriers for cellular communication in the one or more bands; and means for performing the cellular communication over the unlicensed spectrum using the one or more carriers.

In yet another aspect, the disclosure provides a computer program product that includes a computer-readable medium including code for determining one or more bands in unused portions of an unlicensed spectrum; positioning one or more carriers for cellular communication in the one or more bands; and performing the cellular communication over the unlicensed spectrum using the one or more carriers.

These and other aspects of the present disclosure will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
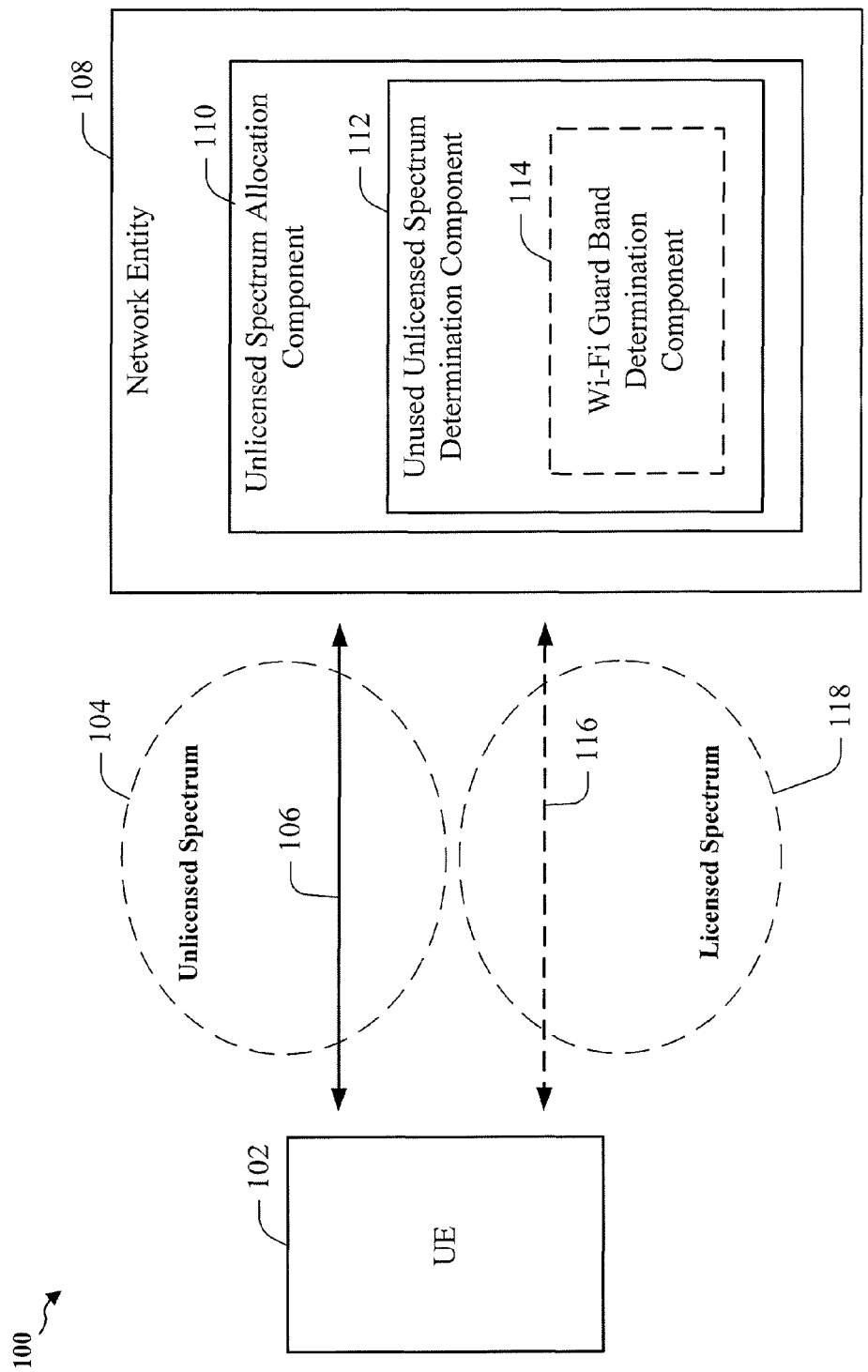
FIG. 1 is a schematic block diagram of one aspect of a system for improved cellular communications over unlicensed spectrum.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

According to some present aspects, methods and apparatus are provided for coexistence of cellular communications such as LTE/LTE Advanced communications over unlicensed spectrum with other communications over unlicensed spectrum (e.g., in WLAN networks such as Wi-Fi networks). Communications over an unlicensed spectrum may refer to, for example, a network operating in a contention-based radio frequency band or spectrum.

In some present aspects, unused unlicensed spectrum (such as the guard band between Wi-Fi frequency channels in the 5 GHz band) may be used to establish robust LTE/LTE Advanced carriers. These aspects use the flexibility in the LTE transmit bandwidth to include control channels in the unused unlicensed spectrum (such as the guard bands between Wi-Fi channels) and thereby provide robust LTE/LTE Advanced communications over un-licensed spectrum. Some present aspects may be used (in one non-limiting example) when there is no clean Wi-Fi channel available.

According to some aspects, for LTE/LTE Advanced communications in a standalone (SA) mode where both the primary component carrier (PCC) and the secondary component carriers (SCCs) are in the unlicensed spectrum, a small spectral bandwidth PCC may be anchored in unused unlicensed spectrum (such as the guard band between two Wi-Fi channels), while the SCCs may be opportunistically allocated or intermittently turned ON/OFF. For example, the SCCs may opportunistically (e.g., when needed or when appropriate) use a guard band or a Wi-Fi channel based on criteria such as cell loading or backhaul constraints. Accordingly, these aspects may provide reliable and robust PCC anchor for SA mode of operation, and may further provide peaceful coexistence without compromising the coverage of LTE/LTE Advanced in SA mode. In some alternative or additional aspects, in SA mode, the control plane or the quality of service signaling may be employed over the guard band channels. In some aspects, alternatively or additionally, data plane over SCCs may be positioned on Wi-Fi guard bands or in-band with Wi-Fi. Also, in some aspects, idle or lightly loaded LTE evolved Node Bs (eNBs) may be switched to a lower bandwidth configuration and may be positioned in Wi-Fi guard bands to reduce interference to Wi-Fi. Further, critical or persistent signaling such as primary synchronization signal (PSS) and secondary synchronization signal (SSS) for cell discovery, broadcast channel (BCH), and primary cell (PCell) cell-specific reference signal (CRS) may be employed in Wi-Fi guard band spectrum.

In some aspects, for LTE/LTE Advanced communications in a supplemental downlink (SDL) mode or in a carrier aggregation (CA) mode, a number of SCCs (e.g., up to 4 SCCs which may be equivalent to up to 12 MHz in total of Wi-Fi interference-free spectrum) may be opportunistically aggregated by using Wi-Fi guard bands. In one non-limiting example, these aspects may be applied to light traffic loads. Accordingly, these aspects may cause no co-channel interference to Wi-Fi since LTE/LTE Advanced communications are out of band with respect to Wi-Fi.

Some present aspects may lower the mutual interference between two or more radio access technologies (RATs) that share unlicensed spectrum by establishing LTE/LTE Advanced carriers based on the transmission emission masks in one or more of such RATs.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Referring to FIG. 1, in one aspect, a wireless communication system 100 includes UE 102 and network entity 108 that are communicating first signals 106 over unlicensed spectrum 104. Optionally, UE 102 and network entity 108 may further communicate second signals 116 over licensed spectrum 118. Network entity 108 may be an entity in an LTE/LTE Advanced network that shares the unlicensed spectrum 104 with other networks such as Wi-Fi networks (not shown), and may include unlicensed spectrum allocation component 110 that allocates bands in unlicensed spectrum 104 for communication between UE 102 and network entity 108. Conventionally, an LTE/LTE Advanced network may not be able to act as a Wi-Fi access point to share the unlicensed spectrum 104 efficiently with a Wi-Fi network, since an LTE/LTE Advanced network does not have a spectrum sharing protocol similar to carrier sense multiple access (CSMA) protocol that is used in Wi-Fi, and even if the LTE/LTE Advanced network provides such similar protocol, mutual interference may still exist due to the hidden terminal problem where a node is visible from one access point but not from other nodes communicating with that access point. Additionally, in standalone LTE networks, a robust PCC may need to operate in the unlicensed spectrum without interfering with Wi-Fi networks. Conventionally, in order to protect nearby Wi-Fi networks and co-exist with them, LTE channel selection is used to scan the medium for Wi-Fi presence across channels and select the best channel. However, because of the limited number of Wi-Fi channels, if there is a high access point deployment density, there may be no clean channels available.

In some present aspects, in order to protect nearby Wi-Fi networks and co-exist with them, UE 102 and network entity 108 communicate signals 106 over unlicensed spectrum 104 by using unused unlicensed spectrum such as the guard band between Wi-Fi frequency channels. For example, unlicensed spectrum allocation component 110 of network entity 108 may include unused unlicensed spectrum determination component 112 that identifies unused unlicensed spectrum to be used for positioning LTE carriers. Optionally, unused unlicensed spectrum determination component 112 may include Wi-Fi guard band determination component 114 that determines Wi-Fi guard bands to be used for positioning LTE carriers.

Figure 2:
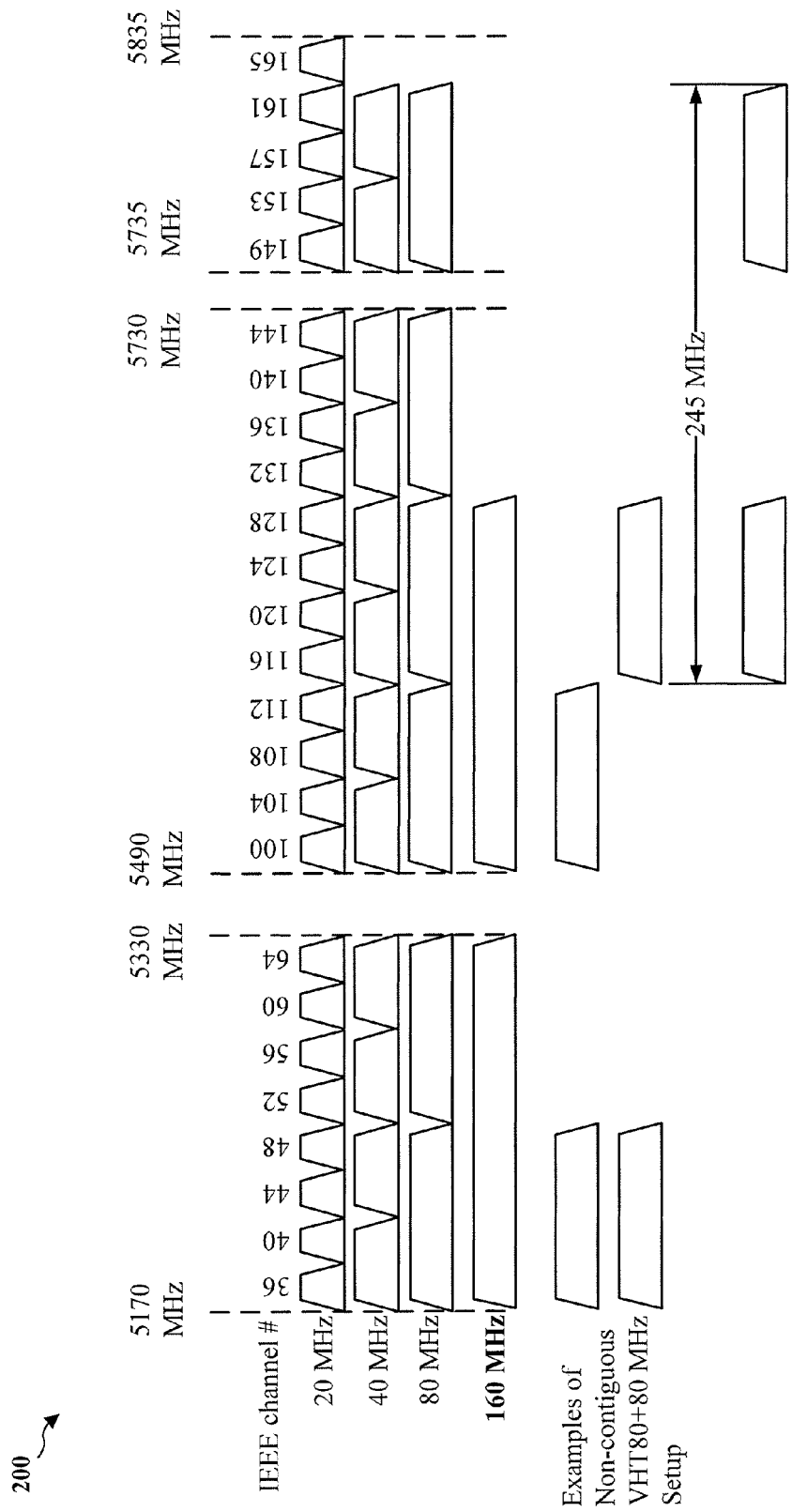
FIG. 2 is a diagram illustrating an example Wi-Fi channelization.
Figure 3:
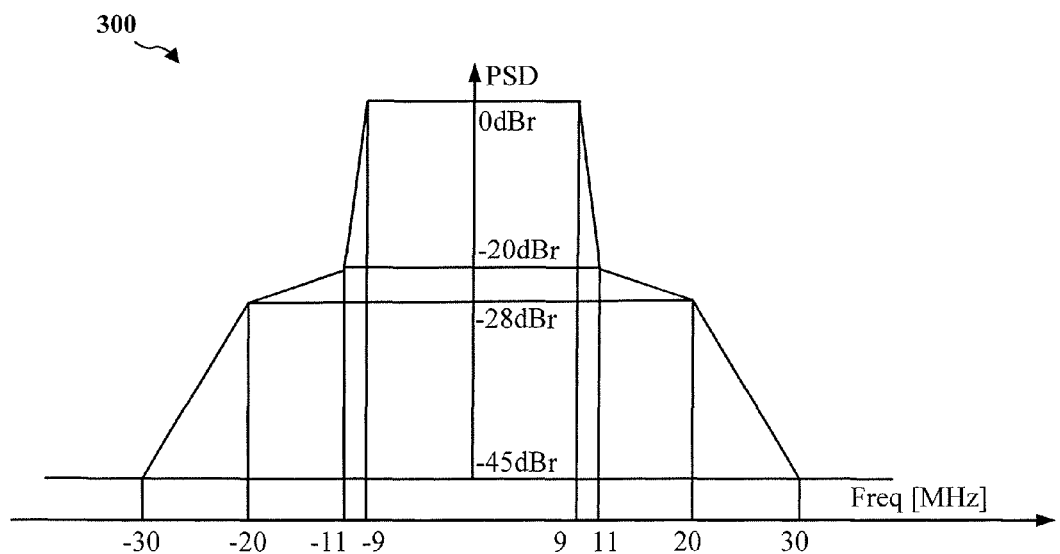
FIGS. 3-7 are diagrams illustrating example Wi-Fi transmit emission masks.
Figure 4:
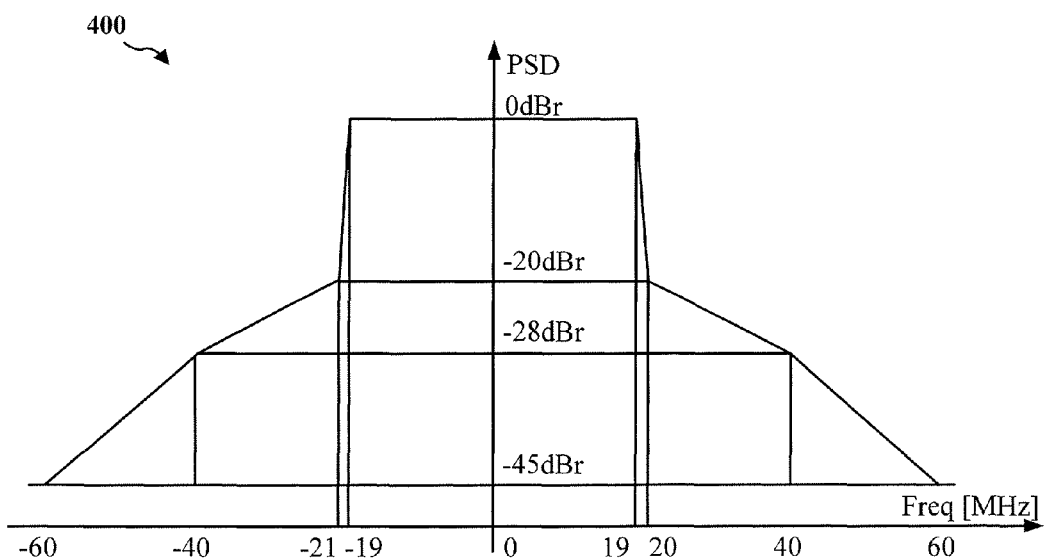
Figure 5:
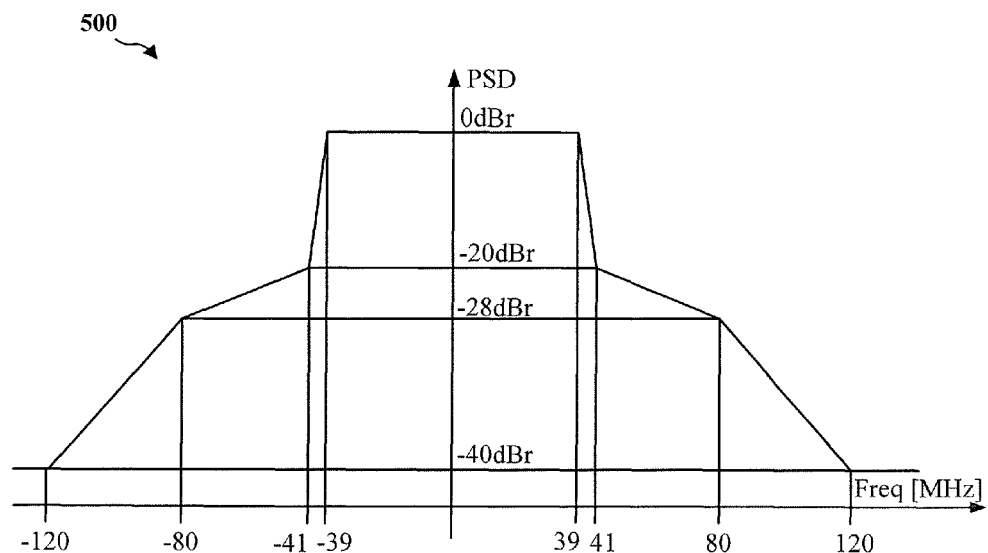
Figure 6:
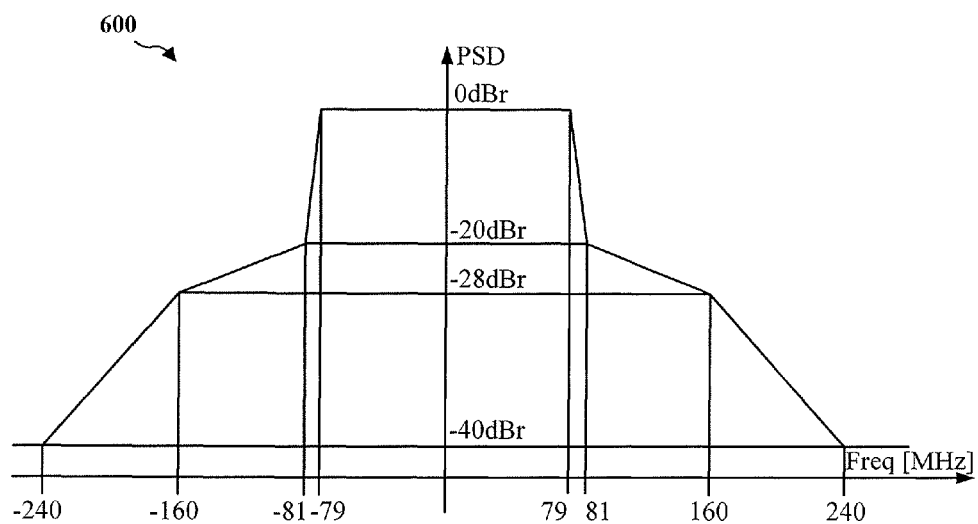

In some aspects, unlicensed spectrum allocation component 110 may determine the positioning and bandwidth of LTE carriers in the 5 GHz band based on the Wi-Fi channel bandwidth advertised by nearby access points in beacon frames. FIG. 2 shows an example of such Wi-Fi channelization 200 used by an access point and advertised periodically in beacon frames. In these aspects, the bandwidth of the LTE carrier may be small, for example, 1.4 MHz or 3 MHz. Some bands or channels in the example Wi-Fi channelization 200 may not be available in all geographical regions or countries. Further, some bands or channels (e.g., channels 120, 124, 128, and 132) may be allocated to the weather radar. In some present aspects, for example, in an SA mode, an LTE eNB may position its PCC in between a set of channels based on the neighboring WLAN access points. For example, an LTE eNB may position its PCC in between any of the 20 MHz channels if the neighboring WLAN access points are only 20 MHz capable, or in between channels 161-165, 153-157, 136-140, 128-132, etc., if the neighboring WLAN access points are only 20/40 MHz capable, or in between channels 161-165, 128-132, 112-116 etc., if the neighboring WLAN access points are only 20/40/80 MHz capable.

Figure 7:
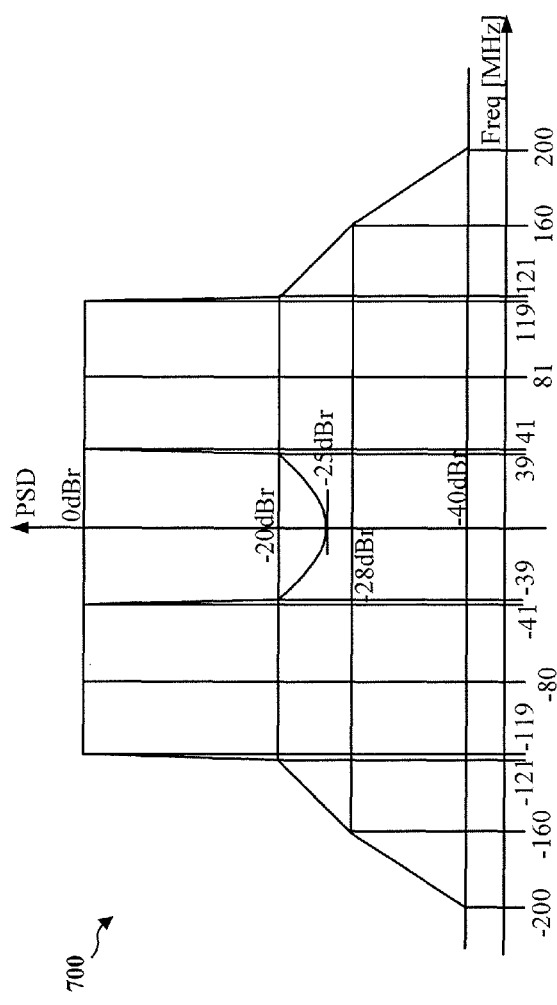

FIGS. 3-6 show example Wi-Fi transmit emission masks 300, 400, 500, 600, for a 20 MHz, 40 MHz, 80 MHz, and 160 MHz channel, respectively, and FIG. 7 shows an example spectral mask 700 for 80+80 MHz signals with center frequencies separated by 160 MHz. The example Wi-Fi transmit emission masks 300, 400, 500, 600 may result in lower adjacent channel Wi-Fi interference to LTE when LTE occupies the unused unlicensed spectrum between Wi-Fi carriers, compared to going in band with WiFi. Further, the reduction in the interference of Wi-Fi to LTE may be larger in some practical implementations.

Figure 8:
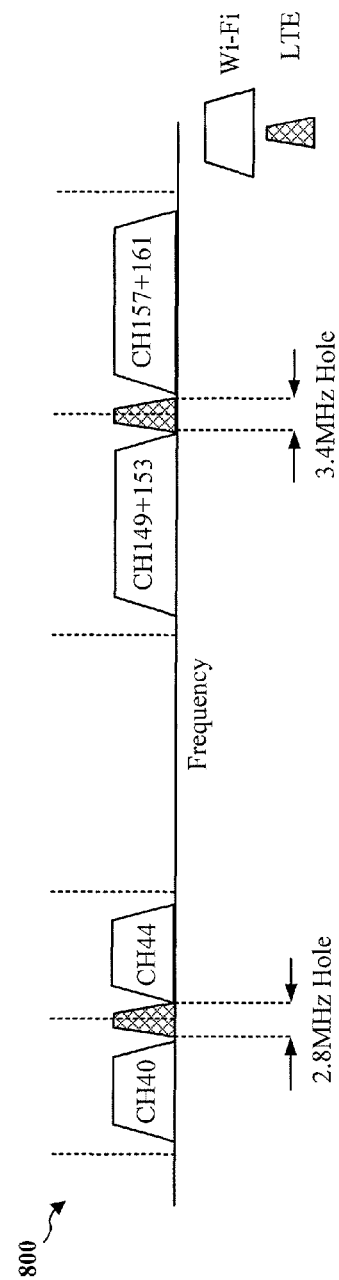
FIG. 8 is a diagram illustrating example Wi-Fi bandwidth holes.

FIG. 8 shows an example spectrum allocation 800 where Wi-Fi bandwidth holes may be used for LTE communication according to some present aspects. The present aspects, however, are not limited to the example aspect shown in FIG. 8, and other bandwidth portions that overlap with Wi-Fi bandwidth may alternatively or additionally be used for LTE communications.

Figure 9:
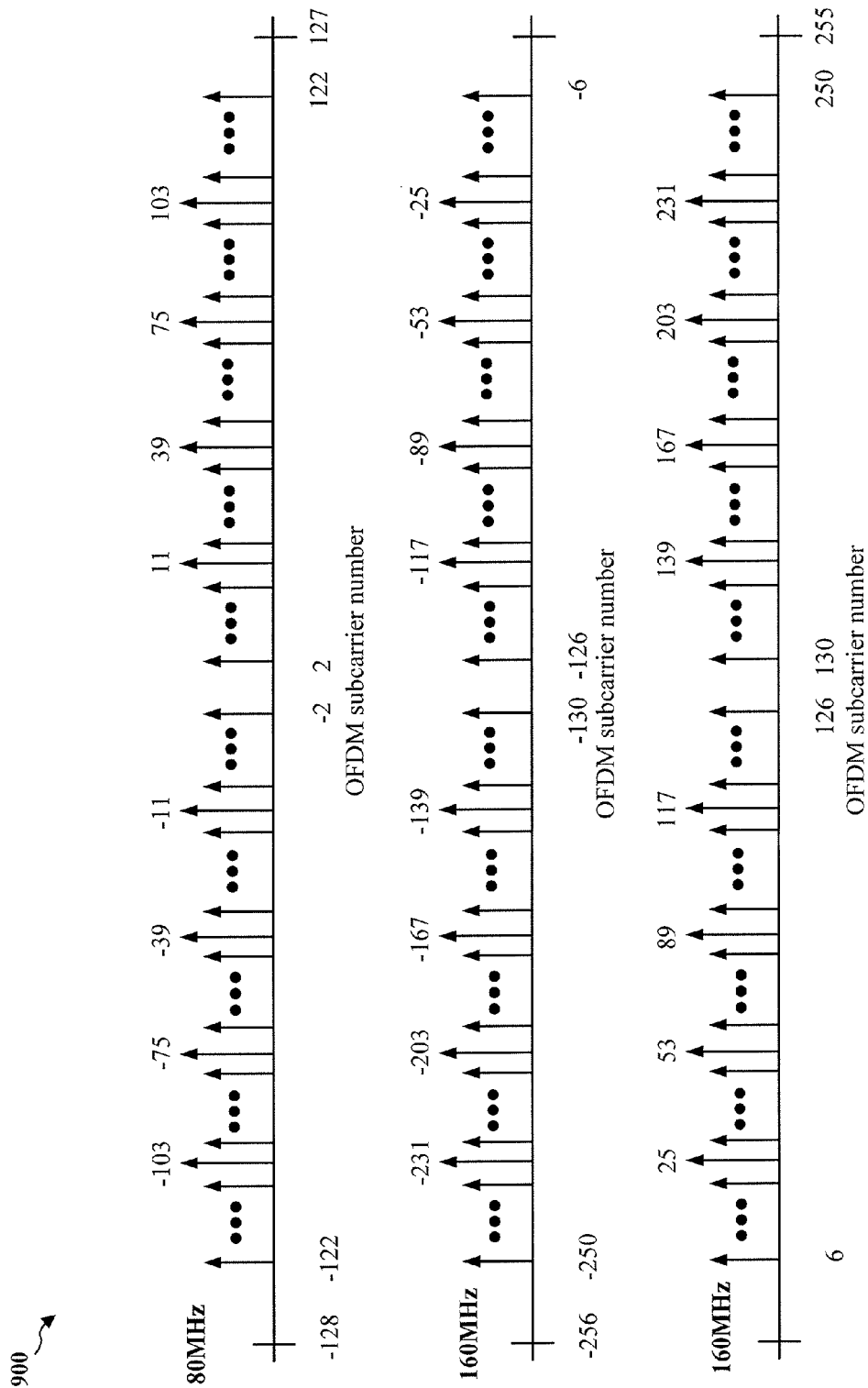
FIG. 9 is a diagram illustrating example orthogonal frequency division multiplexing (OFDM) subcarrier designs.

FIG. 9 shows example 80 MHz and 160 MHz OFDM subcarrier designs. In Wi-Fi, the guard band bandwidth is derived based on the number of null subcarriers on the band edges for different data transmission bandwidths, and the subcarrier spacing is ~312.5 kHz. For example, in the 20 MHz legacy channelization (802.11a), there are 6 null subcarriers on the left and 5 null subcarriers on the right (3.4375 MHz bandwidth), in the 20 MHz HT channelization (802.11n), there are 4 null subcarriers on the left and 5 null subcarriers on the right (2.8125 MHz bandwidth), and in the 40 MHz HT channelization (802.11n) and 80/160 MHz VHT channelization (802.11ac), there are 6 null subcarriers on the left and 5 null subcarriers on the right (3.4375 MHz bandwidth). The LTE carriers established according to the present aspects are more robust than those aligned with the Wi-Fi center frequency since the interference of Wi-Fi to LTE is reduced in the present aspects by, for example, up to 20 dB, due to the Wi-Fi transmit spectral mask as shown, for example, in FIGS. 3-7. That is, the example Wi-Fi transmit emission masks 300, 400, 500, 600 may result in lower adjacent channel Wi-Fi interference to LTE when LTE occupies the unused unlicensed spectrum between Wi-Fi carriers, compared to going in band with WiFi. Further, the reduction in the interference of Wi-Fi to LTE may be larger in some practical implementation. Additionally, the interference of LTE to Wi-Fi may also be reduced since the channel bandwidth occupied by LTE is within the data subcarrier region in Wi-Fi. Table 1 shows some example channel bandwidths and respective occupied bandwidths that are available in LTE/LTE advanced communications over un-licensed spectrum.

TABLE 1

Example channel bandwidths and respective occupied bandwidths in LTE/LTE Advanced communications over un-licensed spectrum

| Channel Bandwidth (MHz) | Occupied Bandwidth (MHz) |
| --- | --- |
| 1.4 | 1.14 |
| 3 | 2.7 |
| 5 | 4.50 |
| 10 | 9.00 |
| 15 | 13.5 |
| 20 | 18.0 |

Some present aspects provide LTE/LTE advanced communications over un-licensed bandwidth by leveraging the variety of transmission bandwidths provided in LTE which enables spectrum allocation flexibility. In some aspects, frequency division multiplexing is performed in between Wi-Fi channels, e.g., across multiple Wi-Fi guard bands, to multiplex LTE carriers with small bandwidths.

In some present aspects, when the SCC of the LTE or LTE Advanced communications over unlicensed spectrum goes in-band with Wi-Fi, unlicensed spectrum allocation component 110 may avoid primary carriers and position the PCC/SCC on the 20/40/80/160 MHz band edges. In these aspects, the avoided primary carrier may correspond to, for example, the primary 20 MHz channel used by Wi-Fi for Wi-Fi control and management frame transmissions. Accordingly, unlicensed spectrum allocation component 110 avoids this channel when going in-band with Wi-Fi, since the WLAN network operation may be disrupted if this channel is not avoided. For example, interfering with a secondary 20 MHz channel of a WLAN access point may be favorable compared to interfering with the primary channel.

The present aspects are not limited to positioning LTE/LTE advanced carriers in the guard bands between two Wi-Fi channels, and may alternatively or additionally be applied for using spectrum holes created by any RAT in the unlicensed spectrum. For example, the present aspects may be used in the 10 MHz of spectrum that is unoccupied between 5725 MHz and 5735 MHz in the Unlicensed National Information Infrastructure (UNII) Upper band, or in the 15 MHz between 5835 and 5850 MHz in the ISM band, to provide for LTE/LTE advanced communication in unlicensed spectrum without interference to Wi-Fi.

In some additional or alternative aspects, unlicensed spectrum allocation component 110 may adjust the presence or the bandwidth of each LTE carrier based on channel quality indicator (CQI) feedback from UE 102. For example, if the CQI feedback indicates interference in a (sub)-band that includes PSS/SSS, then unlicensed spectrum allocation component 110 may change the LTE carrier (e.g. remove, reposition, resize, or otherwise adjust) to reduce interference to Wi-Fi. Such adjustments may include a change in the transmit power or a steering in a radio frequency (RF) beam pattern (e.g. to place a null in the interference direction). Unlicensed spectrum allocation component 110 may attribute the interference to Wi-Fi if it cannot be attributed to other causes (e.g. cell edge conditions, interference from other known LTE eNBs, etc.). In one example aspect, unlicensed spectrum allocation component 110 may maintain a penalty score for the LTE carriers to indicate the desirability of changing the carrier based on, for example, the number or fraction of UEs with CQI feedback indicative of interference, or the position or direction of such UEs.

In some additional or alternative aspects, unlicensed spectrum allocation component 110 may perform channel selection of the best guard channel for the PCell based on UE measurements. For example, a guard band channel may have interference only from an adjacent Wi-Fi channel and hence may be more likely to be clean, but may still be subject to channel selection. In some aspects, the adjacent channel interference may be non-uniform across a guard band. For example, on the downlink, the eNB may do water-filling by allocating more power to one edge when transmitting signals such as wideband control or data signals. Also, for example, on the uplink, the eNB may schedule a UE preferentially on certain frequency sub-bands, employ PUSCH frequency hopping, and trigger uplink power control for PUCCH and PUSCH. If the UE detects that there is a nearby interferer causing increase in interference-over-thermal (IoT) ratio at the eNB, it may allocate more power to the PUCCH RB transmitted on one edge (assuming fixed total power in a subframe) compared to the other edge. For example, the UE may monitor eNB ACK/NACK for its PUSCH transmissions and correlate the resource assignment of the eNB scheduler to its performance. Such band-selective power control may be applicable to any channel with adjacent channel interference; however, the guard band may have one dominant adjacent channel interferer for which band-selective power control may be used.

Figure 10:
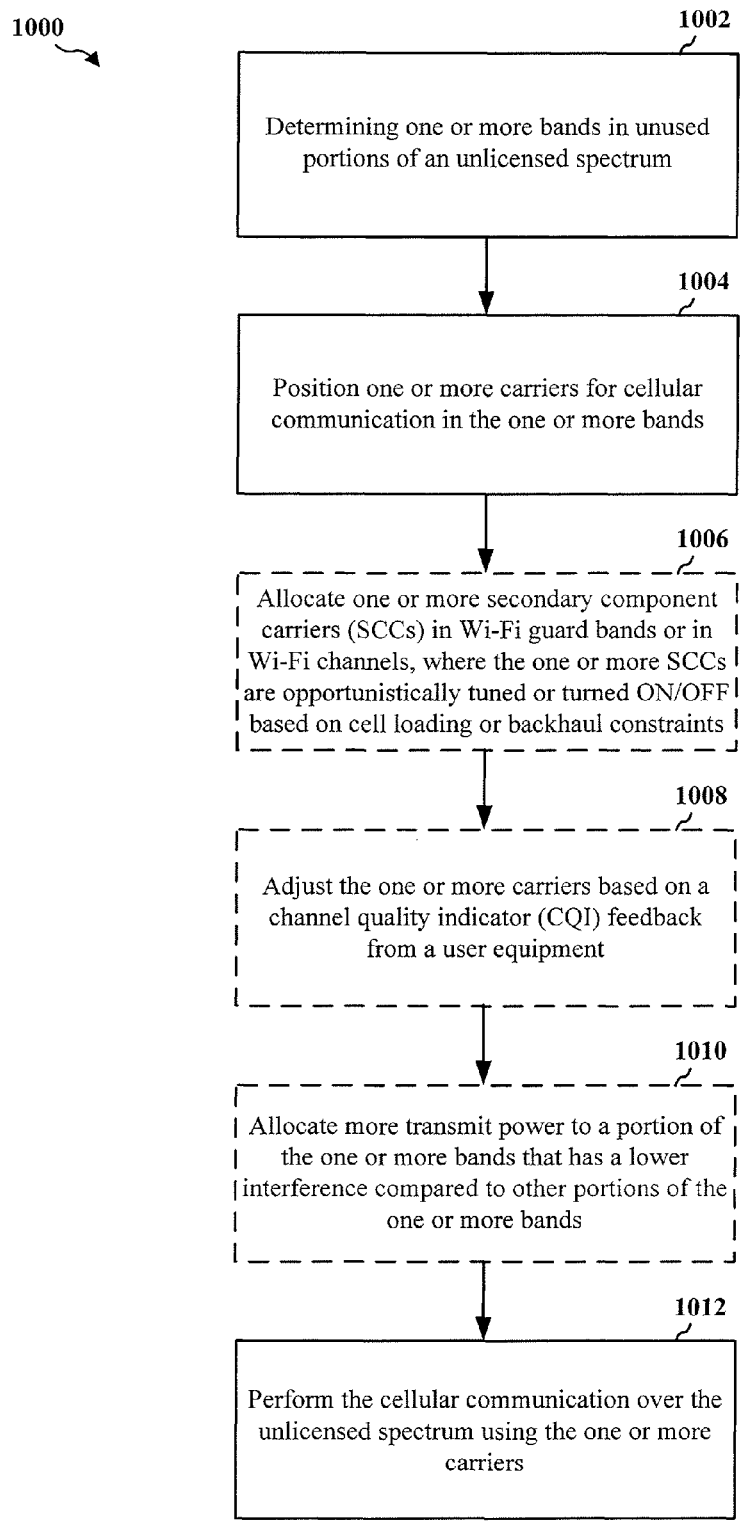
FIG. 10 is a flow chart of a method of wireless communication in aspects of the system of FIG. 1.

Referring to FIG. 10, an example method 1000 for improved cellular communications over unlicensed spectrum is illustrated. For explanatory purposes, method 1000 will be discussed with reference to the above described FIG. 1. It should be understood that in other implementations, other systems and/or UEs, Node Bs, or other apparatus comprising different components than those illustrated in FIG. 1 may be used in implementing method 1000 of FIG. 10.

At block 1002, method 1000 includes determining one or more bands in unused portions of an unlicensed spectrum. For example, unused unlicensed spectrum determination component 112 may determine one or more bands in unused portions of an unlicensed spectrum. In some aspects, the one or more bands may include one or more guard bands in a WLAN, and the cellular communication may include an LTE or LTE advanced communication over the unlicensed spectrum.

At block 1004, method 1000 includes positioning one or more carriers for cellular communication in the one or more bands. For example, unlicensed spectrum allocation component 110 may position one or more carriers for cellular communication in the one or more bands determined by unused unlicensed spectrum determination component 112. In some aspects, the one or more carriers may include one or more of a control channel, a PCC, an SCC, a control plane, a quality of service signaling, a PSS, an SSS, a BCH, or a PCell CRS.

In some aspects, where the cellular communication is in a standalone mode, the one or more carriers may include a PCC that is positioned in a Wi-Fi guard band. In these aspects, method 1000 may include, at optional block 1006, allocating one or more SCCs in Wi-Fi guard bands or in Wi-Fi channels, where the one or more SCCs are opportunistically tuned or turned ON/OFF based on cell loading or backhaul constraints. For example, spectrum allocation component 110 may optionally allocate one or more SCCs in Wi-Fi guard bands or in Wi-Fi channels, and opportunistically tune the SCCs or turn them ON/OFF based on cell loading or backhaul constraints.

In some aspects, the one or more bands may include one or more Wi-Fi guard bands. In these aspects, spectrum allocation component 110 may further allocate one or more SCCs in the one or more bands or in Wi-Fi channels.

In some aspects, where the cellular communication is in a SDL or CA mode, spectrum allocation component 110 may aggregate one or more SCCs in the one or more bands. In some aspects, spectrum allocation component 110 may perform frequency division multiplexing in the one or more bands to multiplex the one or more carriers.

Optionally, at block 1008, method 1000 may include adjusting the one or more carriers based on a CQI feedback from a user equipment. For example, in some aspects, spectrum allocation component 110 may optionally adjust the one or more carriers based on a CQI feedback from UE 102.

In some aspects, spectrum allocation component 110 may further position the one or more carriers based on channel state measurements of UE 102.

In some aspects, spectrum allocation component 110 may position the one or more carriers based on non-uniform adjacent channel interference across the one or more bands. In these aspects, method 1000 may include, at optional block 1010, allocating more transmit power to a portion of the one or more bands that has a lower interference compared to other portions of the one or more bands. For example, spectrum allocation component 110 may optionally allocate more transmit power to a portion of the one or more bands that has a lower interference compared to other portions of the one or more bands.

At block 1012, method 1000 includes performing the cellular communication over the unlicensed spectrum using the one or more carriers. For example, network entity 108 may perform the cellular communication over the unlicensed spectrum with UE 102, using the one or more carriers positioned by spectrum allocation component 110.

Figure 11:
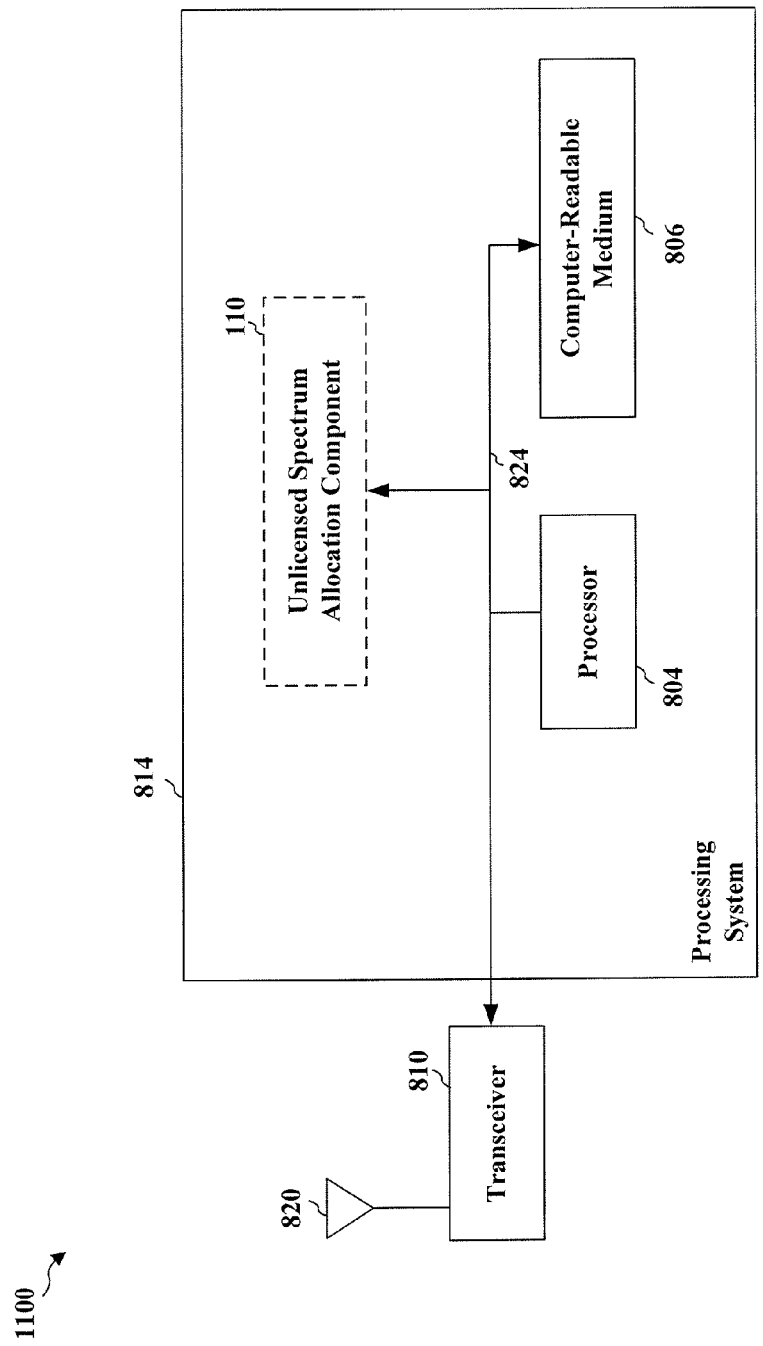
FIG. 11 is a diagram illustrating an example of a hardware implementation for an apparatus employing a processing system, including aspects of the system of FIG. 1.

FIG. 11 is a diagram illustrating an example of a hardware implementation for an apparatus 1100 employing a processing system 814 to operate UE 102, network entity 108, or unlicensed spectrum allocation component 110 (see FIG. 1). The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 804, the unlicensed spectrum allocation component 110, and the computer-readable medium 806. The bus 824 may also link various other circuits such as timing sources, peripherals, voltage regulators, and power management circuits, which are well known in the art, and therefore, will not be described any further.

The apparatus may include additional modules that perform the functions or operations described in the aforementioned flow chart of FIG. 10. As such, each function or operation in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The processing system 814 may be coupled to a transceiver 810. The transceiver 810 is coupled to one or more antennas 820. The transceiver 810 provides a means for communicating with various other apparatus over a transmission medium. The processing system 814 includes a processor 804 coupled to a computer-readable medium 806. The processor 804 is responsible for general processing, including the execution of software stored on the computer-readable medium 806. The software, when executed by the processor 804, causes the processing system 814 to perform the various functions described supra for any particular apparatus. The computer-readable medium 806 may also be used for storing data that is manipulated by the processor 804 when executing software. The processing system further includes modules such as unlicensed spectrum allocation component 110. The modules may be software modules running in the processor 804, resident/stored in the computer readable medium 806, one or more hardware modules coupled to the processor 804, or some combination thereof.

Figure 12:
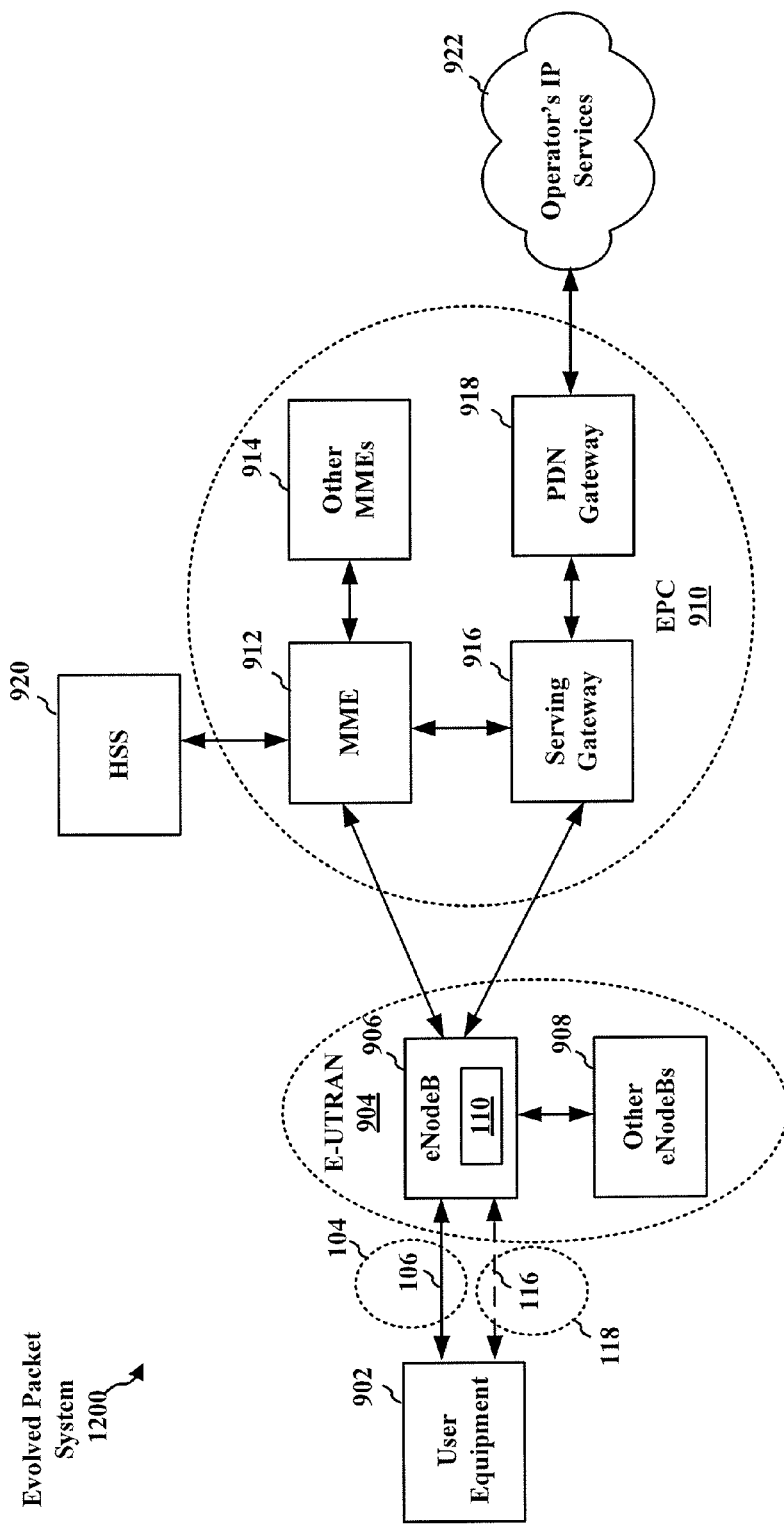
FIG. 12 is a diagram illustrating an example of a network architecture including aspects of the system of FIG. 1.

FIG. 12 is a diagram illustrating an LTE network architecture 1200. The LTE network architecture 1200 may be referred to as an Evolved Packet System (EPS) 1200. The EPS 1200 may include one or more user equipments (UEs) 902 (which may be UE 102 of FIG. 1 or apparatus 1100 of FIG. 10), an Evolved UMTS Terrestrial Radio Access Network (E-UTRAN) 904, an Evolved Packet Core (EPC) 910, a Home Subscriber Server (HSS) 920, and an Operator's IP Services 922. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 906 and other eNBs 908, which may be network entity 108 of FIG. 1 or apparatus 1100 of FIG. 10. The eNB 906 and UE 902 may communicate first signals 106 over unlicensed spectrum 104. Optionally, eNB 906 and UE 902 may further communicate second signals 116 over licensed spectrum 118. The eNB 906 provides user and control planes protocol terminations toward the UE 902 and includes unlicensed spectrum allocation component 110 to perform any of the functions described herein with reference to the flowchart of FIG. 10. The eNB 906 may be connected to the other eNBs 908 via a backhaul (e.g., an X2 interface). The eNB 906 may also be referred to as a base station, a base transceiver station, a radio base station, a radio transceiver, a transceiver function, a basic service set (BSS), an extended service set (ESS), or some other suitable terminology. The eNB 906 provides an access point to the EPC 910 for a UE 902. Examples of UEs 902 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 902 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 906 is connected by an S1 interface to the EPC 910. The EPC 910 includes a Mobility Management Entity (MME) 912, other MMEs 914, a Serving Gateway 916, and a Packet Data Network (PDN) Gateway 918. The MME 912 is the control node that processes the signaling between the UE 902 and the EPC 910. Generally, the MME 912 provides bearer and connection management. All user IP packets are transferred through the Serving Gateway 916, which itself is connected to the PDN Gateway 918. The PDN Gateway 918 provides UE IP address allocation as well as other functions. The PDN Gateway 918 is connected to the Operator's IP Services 922. The Operator's IP Services 922 may include the Internet, the Intranet, an IP Multimedia Subsystem (IMS), and a PS Streaming Service (PSS).

Figure 13:
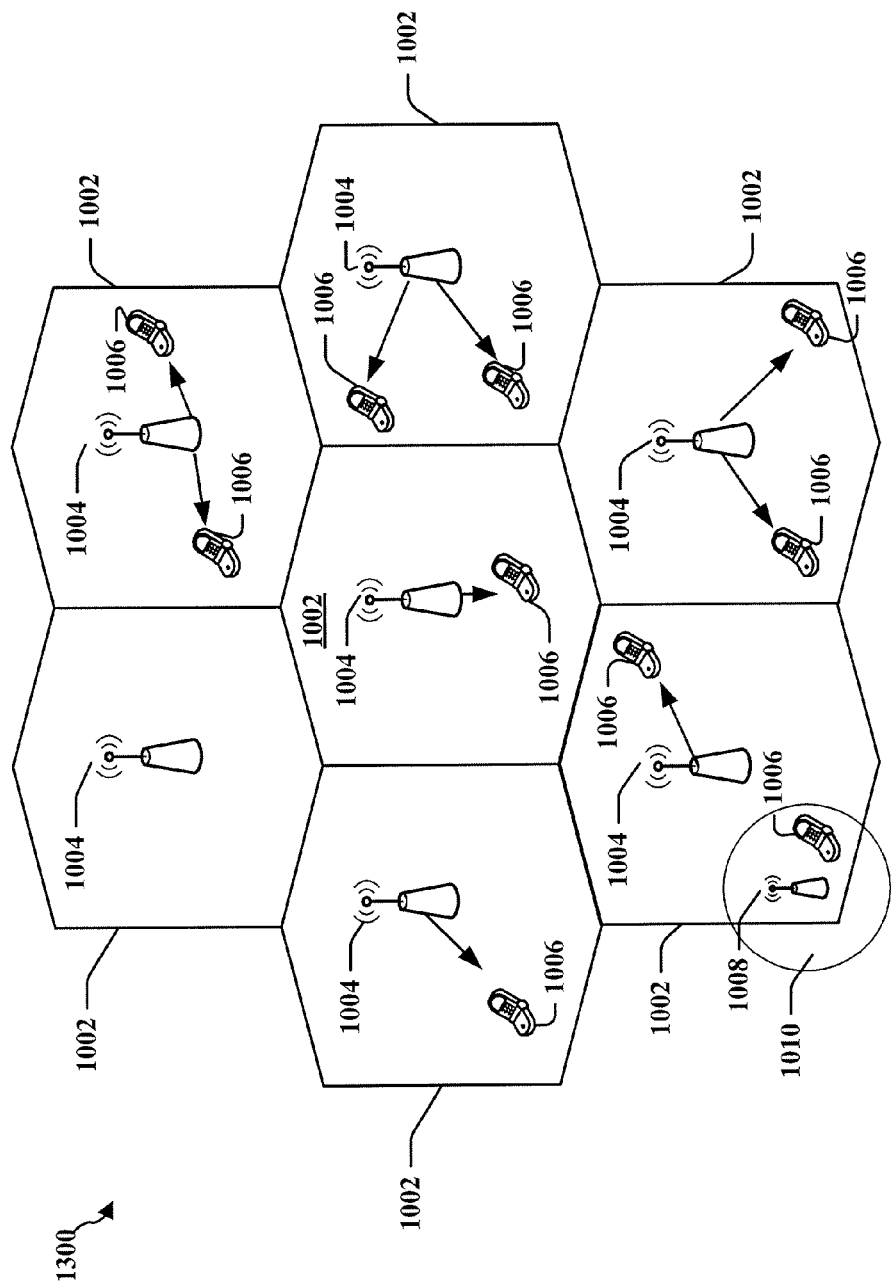
FIG. 13 is a diagram illustrating an example of an access network including aspects of the system of FIG. 1.

FIG. 13 is a diagram illustrating an example of an access network 1300 in an LTE network architecture, including UEs 1006 which may be UE 102, 902, and eNBs 1006, 1008 which may be network entity 108, eNB 906, or apparatus 1100 (see FIGS. 1, 11, 12), and where eNBs 1006, 1008 may include unlicensed spectrum allocation component 110 (not shown) to perform any of the functions described herein with reference to the flowchart of FIG. 10. In this example, the access network 1300 is divided into a number of cellular regions (cells) 1002. One or more lower power class eNBs 1008 may have cellular regions 1010 that overlap with one or more of the cells 1002. The lower power class eNB 1008 may be a small cell such as a femto cell (e.g., home eNB (HeNB)), pico cell, micro cell, or remote radio head (RRH). The macro eNBs 1004 are each assigned to a respective cell 1002 and are configured to provide an access point to the EPC 1200 for all the UEs 1006 in the cells 1002. There is no centralized controller in this example of an access network 1300, but a centralized controller may be used in alternative configurations. The eNBs 1004 are responsible for all radio related functions including radio bearer control, admission control, mobility control, scheduling, security, and connectivity to the serving gateway 916.

The modulation and multiple access scheme employed by the access network 1300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 1004 may have multiple antennas supporting MIMO technology. The use of MIMO technology enables the eNBs 1004 to exploit the spatial domain to support spatial multiplexing, beamforming, and transmit diversity. Spatial multiplexing may be used to transmit different streams of data simultaneously on the same frequency. The data steams may be transmitted to a single UE 1006 to increase the data rate or to multiple UEs 1006 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 1006 with different spatial signatures, which enables each of the UE(s) 1006 to recover the one or more data streams destined for that UE 1006. On the UL, each UE 1006 transmits a spatially precoded data stream, which enables the eNB 1004 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 14:
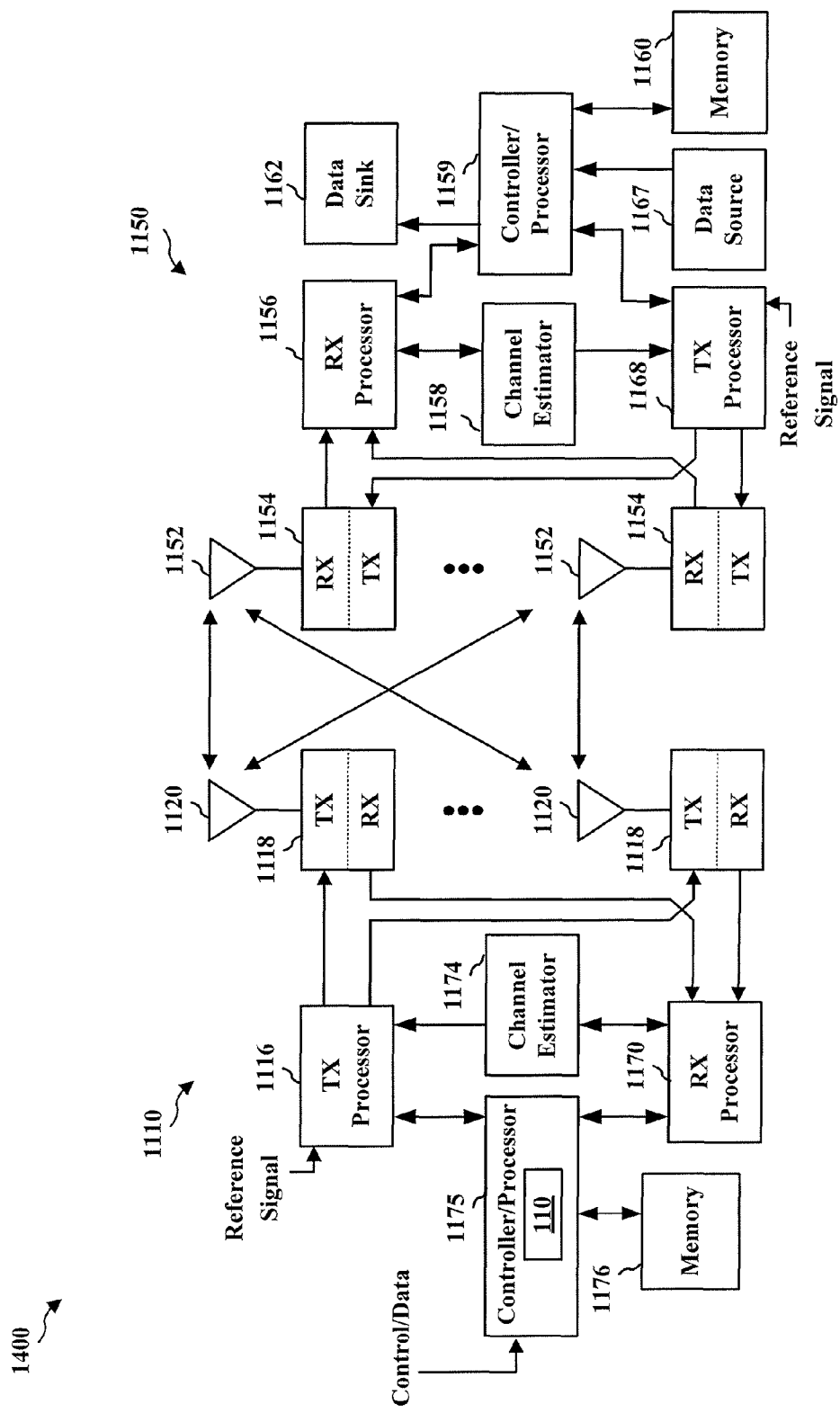
FIG. 14 is a diagram illustrating an example of an evolved Node B and user equipment in an access network, including aspects of the system of FIG. 1.

FIG. 14 is a block diagram of an eNB 1110 in communication with a UE 1150 in an access network, where UE 1150 may be UE 102, 902, 1006, and eNB 1110 may be eNBs 906, 1006, 1008, network entity 108, eNB 906, or apparatus 1100 (see FIGS. 1, 11, 12, 13), and where eNB 1110 includes unlicensed spectrum allocation component 110 to perform any of the functions described herein with reference to the flowchart of FIG. 10. In the DL, upper layer packets from the core network are provided to a controller/processor 1175 that includes unlicensed spectrum allocation component 110 to perform any of the functions described herein with reference to the flowchart of FIG. 10. The controller/processor 1175 implements the functionality of the L2 layer. In the DL, the controller/processor 1175 provides header compression, ciphering, packet segmentation and reordering, multiplexing between logical and transport channels, and radio resource allocations to the UE 1150 based on various priority metrics. The controller/processor 1175 is also responsible for HARQ operations, retransmission of lost packets, and signaling to the UE 1150.

The transmit (TX) processor 1116 implements various signal processing functions for the L1 layer (i.e., physical layer). The signal processing functions includes coding and interleaving to facilitate forward error correction (FEC) at the UE 1150 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1174 may be used to determine the coding and modulation scheme, as well as for spatial processing. The channel estimate may be derived from a reference signal and/or channel condition feedback transmitted by the UE 1150. Each spatial stream is then provided to a different antenna 1120 via a separate transmitter 1118TX. Each transmitter 1118TX modulates an RF carrier with a respective spatial stream for transmission.

At the UE 1150, each receiver 1154RX receives a signal through its respective antenna 1152. Each receiver 1154RX recovers information modulated onto an RF carrier and provides the information to the receive (RX) processor 1156. The RX processor 1156 implements various signal processing functions of the L1 layer. The RX processor 1156 performs spatial processing on the information to recover any spatial streams destined for the UE 1150. If multiple spatial streams are destined for the UE 1150, they may be combined by the RX processor 1156 into a single OFDM symbol stream. The RX processor 1156 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1110. These soft decisions may be based on channel estimates computed by the channel estimator 1158. The soft decisions are then decoded and deinterleaved to recover the data and control signals that were originally transmitted by the eNB 1110 on the physical channel. The data and control signals are then provided to the controller/processor 1159.

The controller/processor 1159 implements the L2 layer. The controller/processor can be associated with a memory 1160 that stores program codes and data. The memory 1160 may be referred to as a computer-readable medium. In the UL, the controller/processor 1159 provides demultiplexing between transport and logical channels, packet reassembly, deciphering, header decompression, control signal processing to recover upper layer packets from the core network. The upper layer packets are then provided to a data sink 1162, which represents all the protocol layers above the L2 layer. Various control signals may also be provided to the data sink 1162 for L3 processing. The controller/processor 1159 is also responsible for error detection using an acknowledgement (ACK) and/or negative acknowledgement (NACK) protocol to support HARQ operations.

In the UL, a data source 1167 is used to provide upper layer packets to the controller/processor 1159. The data source 1167 represents all protocol layers above the L2 layer. Similar to the functionality described in connection with the DL transmission by the eNB 1110, the controller/processor 1159 implements the L2 layer for the user plane and the control plane by providing header compression, ciphering, packet segmentation and reordering, and multiplexing between logical and transport channels based on radio resource allocations by the eNB 1110. The controller/processor 1159 is also responsible for HARQ operations, retransmission of lost packets, and signaling to the eNB 1110.

Channel estimates derived by a channel estimator 1158 from a reference signal or feedback transmitted by the eNB 1110 may be used by the TX processor 1168 to select the appropriate coding and modulation schemes, and to facilitate spatial processing. The spatial streams generated by the TX processor 1168 are provided to different antenna 1152 via separate transmitters 1154TX. Each transmitter 1154TX modulates an RF carrier with a respective spatial stream for transmission.

The UL transmission is processed at the eNB 1110 in a manner similar to that described in connection with the receiver function at the UE 1150. Each receiver 1118RX receives a signal through its respective antenna 1120. Each receiver 1118RX recovers information modulated onto an RF carrier and provides the information to a RX processor 1170. The RX processor 1170 may implement the L1 layer.

The controller/processor 1175 implements the L2 layer. The controller/processor 1175 can be associated with a memory 1176 that stores program codes and data. The memory 1176 may be referred to as a computer-readable medium. In the UL, the control/processor 1175 provides demultiplexing between transport and logical channels, packet reassembly, deciphering, header decompression, control signal processing to recover upper layer packets from the UE 1150. Upper layer packets from the controller/processor 1175 may be provided to the core network. The controller/processor 1175 is also responsible for error detection using an ACK and/or NACK protocol to support HARQ operations.

In one configuration, eNB 1110 may include the apparatus 1100 of FIG. 11 for wireless communication that includes means for determining one or more bands in unused portions of an unlicensed spectrum, means for positioning one or more carriers for cellular communication in the one or more bands, and means for performing the cellular communication over the unlicensed spectrum using the one or more carriers. The aforementioned means may be one or more of the aforementioned modules of the apparatus 1100 and/or the processing system 814 of the apparatus 1100 configured to perform the functions recited by the aforementioned means. The processing system 814 may include the TX Processor 1116, the RX Processor 1170, and the controller/processor 1175. As such, in one configuration, the aforementioned means may be the TX Processor 1116, the RX Processor 1170, and the controller/processor 1175 configured to perform the functions recited by the aforementioned means.

Figure 15:
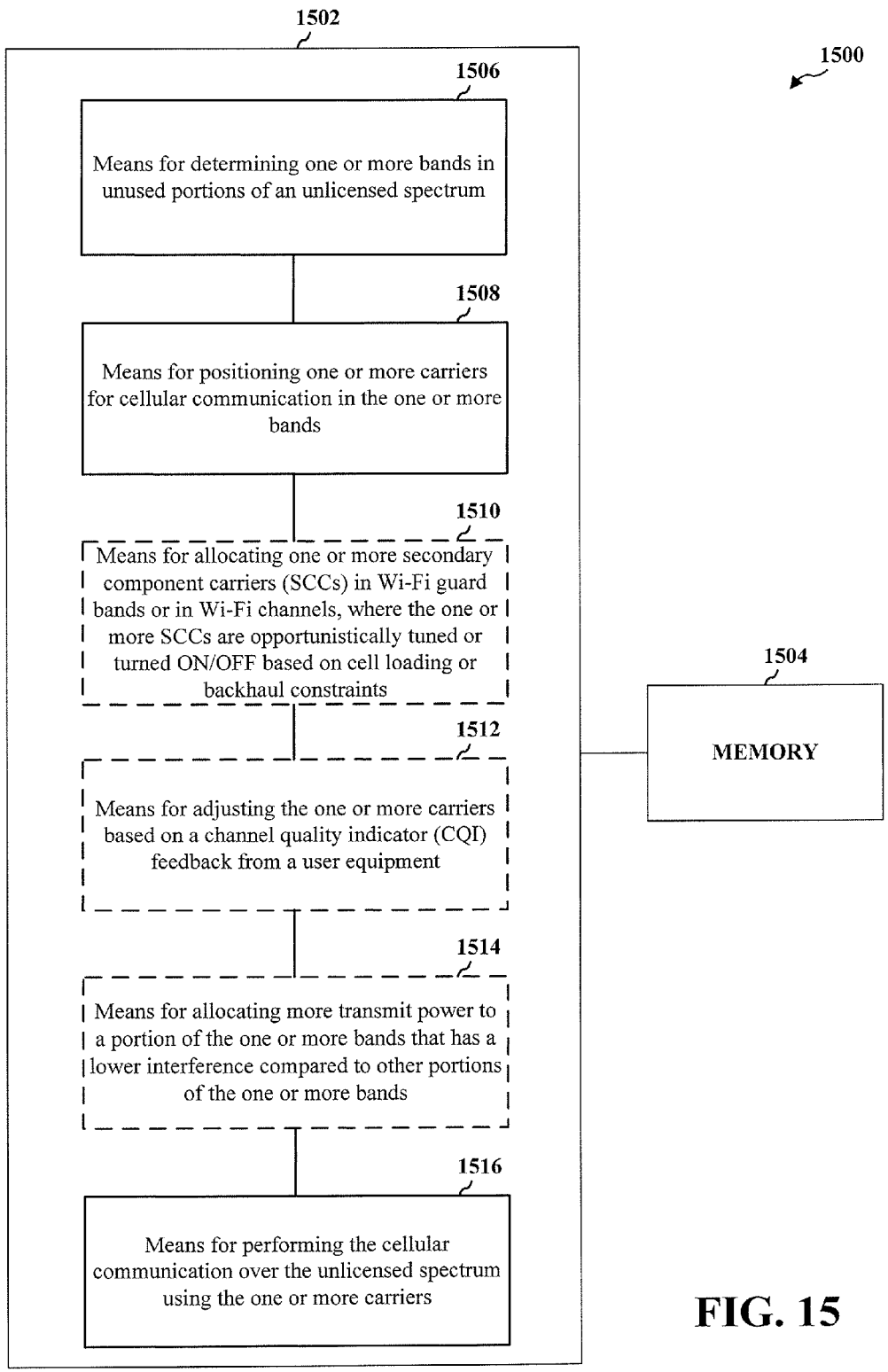
FIG. 15 is a diagram illustrating an example of an apparatus for wireless communications, including aspects of the system of FIG. 1.

Referring to FIG. 15, an apparatus 1500 for wireless communications is illustrated that can reside at least partially within a network entity, a base station, etc. It is to be appreciated that apparatus 1500 is represented as including functional blocks, which can represent functions implemented by a processor, software, or combination thereof (e.g., firmware). As such, apparatus 1500 includes a logical grouping 1502 of electrical components that can act in conjunction. For instance, logical grouping 1502 can include means for determining one or more bands in unused portions of an unlicensed spectrum (block 1506), means for positioning one or more carriers for cellular communication in the one or more bands (block 1508), and means for performing the cellular communication over the unlicensed spectrum using the one or more carriers (block 1516). Optionally, apparatus 1500 may further include one or more of means for allocating one or more secondary component carriers (SCCs) in Wi-Fi guard bands or in Wi-Fi channels, where the one or more SCCs are opportunistically tuned or turned ON/OFF based on cell loading or backhaul constraints (block 1510), means for adjusting the one or more carriers based on a channel quality indicator (CQI) feedback from a user equipment (block 1512), and means for allocating more transmit power to a portion of the one or more bands that has a lower interference compared to other portions of the one or more bands (block 1514).

For example, in an aspect, the means for determining one or more bands in unused portions of an unlicensed spectrum (block 1506), and the means for positioning one or more carriers for cellular communication in the one or more bands (block 1508) can include unused unlicensed spectrum determination component 112 of network entity 108 of FIG. 1 or respective components thereof. Further, for example, in an aspect, the means for performing the cellular communication over the unlicensed spectrum using the one or more carriers (block 1516) can include network entity 108 of FIG. 1 or respective components thereof. Optionally, for example, in an aspect, one or more of the means for allocating one or more secondary component carriers (SCCs) in Wi-Fi guard bands or in Wi-Fi channels, where the one or more SCCs are opportunistically tuned or turned ON/OFF based on cell loading or backhaul constraints (block 1510), the means for adjusting the one or more carriers based on a channel quality indicator (CQI) feedback from a user equipment (block 1512), and the means for allocating more transmit power to a portion of the one or more bands that has a lower interference compared to other portions of the one or more bands (block 1514) can include unused unlicensed spectrum determination component 112 of network entity 108 of FIG. 1 or respective components thereof.

Additionally, apparatus 1500 can include a memory 1504 that retains instructions for executing functions associated with electrical components 1506, 1508, 1510, 1512, 1514, and 1516. While shown as being external to memory 1504, it is to be understood that one or more of electrical components 1506, 1508, 1510, 1512, 1514, and 1516 can exist within memory 1504. In an aspect, for example, memory 1504 may be the same as or similar to computer-readable medium 806 of FIG. 1100 or memory 1176 of FIG. 14.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The term "small cell," as used herein, refers to a relative low transmit power and/or a relatively small coverage area cell as compared to a transmit power and/or a coverage area of a macro cell. Further, the term "small cell" may include, but is not limited to, cells such as a femto cell, a pico cell, access point base stations, Home NodeBs, femto access points, or femto cells. For instance, a macro cell may cover a relatively large geographic area, such as, but not limited to, several kilometers in radius. In contrast, a pico cell may cover a relatively small geographic area, such as, but not limited to, a building. Further, a femto cell also may cover a relatively small geographic area, such as, but not limited to, a home, or a floor of a building.

It is understood that the specific order or hierarchy of steps in the processes disclosed is an illustration of example approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

What is claimed is:

1. A method for establishing cellular communication using a first radio access technology (RAT) of wireless communication, comprising:

determining, by a network entity, one or more bands in unused portions of an unlicensed spectrum, wherein the one or more bands comprise one or more guard bands of a second RAT, the one or more guard bands comprising a band between two frequency channels of the second RAT, and wherein the determining is in response to determining that there are no channels available in the second RAT;

positioning, by the network entity, one or more carriers for the cellular communication using the first RAT in the one or more guard bands of the second RAT; and performing, by the network entity, the cellular communication over the unlicensed spectrum using the one or more carriers.

2. The method of claim 1, wherein the first RAT is long term evolution (LTE) and the second RAT is wireless local area network (WLAN).

3. The method of claim 1, wherein the cellular communication comprises an LTE advanced communication over the unlicensed spectrum.

4. The method of claim 1, wherein the one or more carriers include one or more of a control channel, a primary component carrier (PCC), a secondary component carrier (SCC), a control plane, a quality of service signaling, a primary synchronization signal (PSS), a secondary synchronization signal (SSS), a broadcast channel (BCH), or a primary cell (PCell) cell-specific reference signal (CRS).

5. The method of claim 1, wherein the cellular communication is in a standalone mode, and wherein the one or more carriers include a primary component carrier (PCC) that is positioned in a Wi-Fi guard band, wherein the Wi-Fi guard band is one of the one or more guard bands of the second RAT, the method further comprising:

allocating one or more secondary component carriers (SCCs) in the Wi-Fi guard band or in Wi-Fi channels, wherein the one or more SCCs are opportunistically tuned or turned ON/OFF based on cell loading or backhaul constraints.

6. The method of claim 1, wherein the cellular communication is in a supplemental downlink (SDL) mode or in a carrier aggregation (CA) mode, and wherein the positioning comprises:

aggregating one or more secondary component carriers (SCCs) in the one or more bands.

7. The method of claim 1, wherein the positioning comprises:

performing frequency division multiplexing in the one or more bands to multiplex the one or more carriers.

8. The method of claim 1, further comprising:

adjusting the one or more carriers based on a channel quality indicator (CQI) feedback from a user equipment.

9. The method of claim 1, wherein the positioning is based on channel state measurements of a user equipment.

10. The method of claim 1, wherein the positioning is based on non-uniform adjacent channel interference across the one or more bands, the method further comprising:

allocating more transmit power to a portion of the one or more bands that has a lower interference compared to other portions of the one or more bands.

11. The method of claim 1, wherein the cellular communication comprises steering in a radio frequency (RF) beam pattern.

12. An apparatus for establishing cellular communication using a first radio access technology (RAT) of wireless communication, comprising:

a processing system configured to:
- determine one or more bands in unused portions of an unlicensed spectrum, wherein the one or more bands comprise one or more guard bands of a second RAT, the one or more guard bands comprising a band between two frequency channels of the second RAT, and wherein the determining is in response to determining that there are no channels available in the second RAT;
- position one or more carriers for the cellular communication using the first RAT in the one or more guard bands of the second RAT; and
- perform the cellular communication over the unlicensed spectrum using the one or more carriers.

13. The apparatus of claim 12, wherein the first RAT is long term evolution (LTE) and the second RAT is wireless local area network (WLAN).

14. The apparatus of claim 12, wherein the cellular communication comprises an LTE advanced communication over the unlicensed spectrum.

15. The apparatus of claim 12, wherein the one or more carriers include one or more of a control channel, a primary component carrier (PCC), a secondary component carrier (SCC), a control plane, a quality of service signaling, a primary synchronization signal (PSS), a secondary synchronization signal (SSS), a broadcast channel (BCH), or a primary cell (PCell) cell-specific reference signal (CRS).

16. The apparatus of claim 12, wherein the cellular communication is in a standalone mode, wherein the one or more carriers include a primary component carrier (PCC) that is positioned in a Wi-Fi guard band, wherein the Wi-Fi guard band is one of the one or more guard bands of the second RAT, wherein the processing system is further configured to:
- allocate one or more secondary component carriers (SCCs) in the Wi-Fi guard band or in Wi-Fi channels, wherein the one or more SCCs are opportunistically tuned or turned ON/OFF based on cell loading or backhaul constraints.

17. The apparatus of claim 12, wherein the cellular communication is in a supplemental downlink (SDL) mode or in a carrier aggregation (CA) mode, wherein the processing system is configured to position the one or more carriers for the cellular communication in the one or more bands by:
- aggregating one or more secondary component carriers (SCCs) in the one or more bands.

18. The apparatus of claim 12, wherein the processing system is configured to position the one or more carriers for the cellular communication in the one or more bands by:
- performing frequency division multiplexing in the one or more bands to multiplex the one or more carriers.

19. The apparatus of claim 12, wherein the processing system is further configured to:
- adjust the one or more carriers based on a channel quality indicator (CQI) feedback from a user equipment.

20. The apparatus of claim 12, wherein the processing system is configured to position the one or more carriers for the cellular communication in the one or more bands based on channel state measurements of a user equipment.

21. The apparatus of claim 12, wherein the processing system is configured to position the one or more carriers for the cellular communication in the one or more bands based on non-uniform adjacent channel interference across the one or more bands, wherein the processing system is further configured to:
- allocate more transmit power to a portion of the one or more bands that has a lower interference compared to other portions of the one or more bands.

22. An apparatus for establishing cellular communication using a first radio access technology (RAT) for wireless communications, comprising:
- a memory; and
- at least one processor coupled with the memory and configured to:
  - determine one or more bands in unused portions of an unlicensed spectrum, wherein the one or more bands comprise one or more guard bands of a second RAT, the one or more guard bands comprising a band between two frequency channels of the second RAT, and wherein the determining is in response to determining that there are no channels available in the second RAT;
  - position one or more carriers for the cellular communication using the first RAT in the one or more guard bands of the second RAT; and
  - perform the cellular communication over the unlicensed spectrum using the one or more carriers.

23. The apparatus of claim 22, wherein the first RAT is long term evolution (LTE) and the second RAT is wireless local area network (WLAN).

24. The apparatus of claim 22, wherein the cellular communication comprises an LTE advanced communication over the unlicensed spectrum.

25. The apparatus of claim 22, wherein the one or more carriers include one or more of a control channel, a primary component carrier (PCC), a secondary component carrier (SCC), a control plane, a quality of service signaling, a primary synchronization signal (PSS), a secondary synchronization signal (SSS), a broadcast channel (BCH), or a primary cell (PCell) cell-specific reference signal (CRS).

26. The apparatus of claim 22, wherein the cellular communication is in a standalone mode, wherein the one or more carriers include a primary component carrier (PCC) that is positioned in a Wi-Fi guard band, wherein the Wi-Fi guard band is one of the one or more guard bands of the second RAT, the at least one processor is further configured to:
- allocated one or more secondary component carriers (SCCs) in the Wi-Fi guard band or in Wi-Fi channels, wherein the one or more SCCs are opportunistically tuned or turned ON/OFF based on cell loading or backhaul constraints.

27. The apparatus of claim 22, wherein the cellular communication is in a supplemental downlink (SDL) mode or in a carrier aggregation (CA) mode, wherein the one or more carriers for the cellular communication are positioned in the one or more bands by:
- aggregating one or more secondary component carriers (SCCs) in the one or more bands.

28. The apparatus of claim 22, wherein the one or more carriers for the cellular communication are positioned in the one or more bands by:
- performing frequency division multiplexing in the one or more bands to multiplex the one or more carriers.

29. The apparatus of claim 22, wherein the at least one processor is further configured to:
- adjust the one or more carriers based on a channel quality indicator (CQI) feedback from a user equipment.

30. The apparatus of claim 22, wherein the one or more carriers for the cellular communication are positioned in the one or more bands based on non-uniform adjacent channel interference across the one or more bands, wherein the at least one processor is further configured to:

allocate more transmit power to a portion of the one or more bands that has a lower interference compared to other portions of the one or more bands.

31. A non-transitory computer-readable medium for establishing cellular communication using a first radio access technology (RAT) for wireless communications comprising code, which, when executed by a processor, causes the processor to perform the steps of:

determining one or more bands in unused portions of an unlicensed spectrum, wherein the one or more bands comprise one or more guard bands of a second RAT, the one or more guard bands comprising a band between two frequency channels of the second RAT, and wherein the determining is in response to determining that there are no channels available in the second RAT;

positioning one or more carriers for cellular communication using the first RAT in the one or more guard bands of the second RAT; and performing the cellular communication over the unlicensed spectrum using the one or more carriers.

* * * * *